(12) United States Patent
Yamakoshi et al.

(10) Patent No.: US 10,053,566 B2
(45) Date of Patent: Aug. 21, 2018

(54) ETHYLENE-VINYL ALCOHOL RESIN COMPOSITION PELLET

(71) Applicant: KURARAY CO., LTD., Kurashiki-shi (JP)

(72) Inventors: Satoshi Yamakoshi, Chiyoda-ku (JP); Naoki Kawakami, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/309,936

(22) PCT Filed: May 12, 2015

(86) PCT No.: PCT/JP2015/063587
§ 371 (c)(1),
(2) Date: Nov. 9, 2016

(87) PCT Pub. No.: WO2015/174396
PCT Pub. Date: Nov. 19, 2015

(65) Prior Publication Data
US 2017/0267851 A1 Sep. 21, 2017

(30) Foreign Application Priority Data

May 12, 2014 (JP) .................. 2014-098431

(51) Int. Cl.
| | |
|---|---|
| *C09D 5/03* | (2006.01) |
| *C08L 23/08* | (2006.01) |
| *C08J 5/18* | (2006.01) |
| *B65D 65/40* | (2006.01) |
| *B29B 9/06* | (2006.01) |
| *B29K 23/00* | (2006.01) |
| *B29K 77/00* | (2006.01) |

(52) U.S. Cl.
CPC .......... *C08L 23/0861* (2013.01); *B65D 65/40* (2013.01); *C08J 5/18* (2013.01); *B29B 9/06* (2013.01); *B29K 2023/086* (2013.01); *B29K 2077/00* (2013.01); *C08J 2323/08* (2013.01); *C08J 2477/02* (2013.01); *C08L 2201/14* (2013.01); *C08L 2203/16* (2013.01)

(58) Field of Classification Search
CPC .......... C08L 23/0861; C08L 2201/14
See application file for complete search history.

(56) References Cited

U.S. PATENT DOCUMENTS

| | | | |
|---|---|---|---|
| 2004/0260006 A1* | 12/2004 | Mabuchi ................ | C08L 21/00 524/502 |
| 2005/0009987 A1 | 1/2005 | Hara et al. | |
| 2010/0055482 A1* | 3/2010 | Furukawa ............... | B32B 27/08 428/474.7 |
| 2011/0135950 A1 | 6/2011 | Okamoto et al. | |
| 2016/0221314 A1 | 8/2016 | Kawai | |

FOREIGN PATENT DOCUMENTS

| | | |
|---|---|---|
| CN | 1572829 A | 2/2005 |
| CN | 105593290 A | 5/2016 |
| EP | 3 053 960 A1 | 8/2016 |
| JP | 62-225535 A | 10/1987 |
| JP | 04-131237 A | 5/1992 |
| JP | 06-345919 A | 12/1994 |
| JP | 07-97491 A | 4/1995 |
| JP | 08-259757 A | 10/1996 |
| JP | 2003-63541 A | 3/2003 |
| JP | 2007-63428 A | 3/2007 |
| JP | 2009-242591 A | 10/2009 |
| JP | 2010-59418 A | 3/2010 |
| TW | 2014/02682 A | 1/2014 |

OTHER PUBLICATIONS

International Search Report dated Jul. 14, 2016 in PCT/JP15/63587 filed May 12, 2015.
Extended European Search Report dated Dec. 8, 2017 in corresponding European Patent Application No. 15792144.6, 7 pages.

* cited by examiner

Primary Examiner — Hannah J Pak
(74) Attorney, Agent, or Firm — Oblon, McClelland, Maier & Neustadt, L.L.P.

(57) ABSTRACT

A pelletized resin composition according to the present invention contains an ethylene-vinyl alcohol resin (A), a polyamide (B), and a lower fatty acid magnesium salt (C) each in a specific amount, wherein the polyamide resin (B) is dispersed in the ethylene-vinyl alcohol resin (A) with an average dispersed particle diameter of 1 µm or less as determined using an electron microscope, and the lower fatty acid magnesium salt (C) is dispersed in both the ethylene-vinyl alcohol resin (A) and the polyamide resin (B). Accordingly, a pelletized resin composition that is superior in hue can be obtained. In addition, a film that is superior in thermal stability in the film formation, the appearance immediately after the film formation, and the appearance after the heating treatment is obtained.

8 Claims, No Drawings

ETHYLENE-VINYL ALCOHOL RESIN COMPOSITION PELLET

CROSS-REFERENCE TO RELATED APPLICATIONS

This application is a National Stage of PCT/JP2015/063587, which was filed on May 12, 2015. This application is based upon and claims the benefit of priority to Japanese Application No. 2014-098431, which was filed on May 12, 2014.

TECHNICAL FIELD

The present invention relates to a pelletized resin composition (may be also referred to as "resin composition pellet(s)" containing an ethylene-vinyl alcohol resin, a polyamide resin and a lower fatty acid magnesium salt, a film or sheet produced from the pelletized resin composition, a molded article produced from the film or sheet, and a production method of the pelletized resin composition.

BACKGROUND ART

Ethylene-vinyl alcohol resins (hereinafter, may be abbreviated as EVOHs) exhibit superior gas barrier properties against oxygen, odors, flavors, etc., and are suitably used for e.g., packaging materials for foods and the like. With respect to such packaging materials, a heating treatment (retort treatment or boiling treatment) with hot water or water vapor is often carried out after filling the packaging materials with contents such as foods. However, the EVOH results in a problem through the heating treatment with hot water or water vapor for a long time period, involving resin whitening and/or deterioration of a capability of keeping the shape of the vacuum-packed contents.

To address such a drawback, molded articles (films, sheets, etc.) produced using, as a material, resin composition pellets produced by mixing the EVOH and a polyamide resin (hereinafter, may be abbreviated as "PA") are used as a packaging material for a heating treatment. In these molded articles, the pellets are often used as a material of an intermediate layer of a multilayer structure, typically a multilayer structure including a layer composed of a polypropylene resin or the like.

However, the multilayer structure mentioned above also has a drawback that whitening (including blooming) may be caused partially or entirely on the surface of the multilayer structure due to the water absorption of the EVOH layer after the heating treatment.

To address the drawback, i.e., the whitening of the entire surface of the multilayer structure, Patent Document 1 (Japanese Unexamined Patent Application, Publication No. H4-131237) discloses a multilayer film including a layer composed of a composition containing an ethylene-vinyl alcohol copolymer resin, a polyamide resin, and a water-soluble or alcohol-soluble metal compound. The film can prevent the whitening of the entire surface of the film which may be caused upon adherence of a water droplet to the surface of the film for a long time period (which is a phenomenon generally referred to as rewhitening). However, the film cannot prevent generation of whitening (turbidity and/or whitening streaks in apart of the film) of a part of the film which may be caused after the heating treatment. In addition, melt-molding of the EVOH and the PA may have a drawback that a gel which is a thermally deteriorated matter of the EVOH and the PA is generated and consequently a pellet containing a residue of the gel is formed, leading to generation of seeds (dirt under paint) in a multilayer structure produced using the pellet as a material.

To address the aforementioned drawback, i.e., the generation of the seeds, Patent Document 2 (Japanese Unexamined Patent Application, Publication No. H7-97491) discloses a multilayer film that includes a layer composed of a composition containing an ethylene-vinyl alcohol copolymer resin, a polyamide resin, and at least two metal salts in which a metal in group II in periodic table is involved. However, a film produced using this resin composition has a drawback that the film is inferior in general appearance after a heating treatment, as also demonstrated in Comparative Example 8 described later.

Besides, to address the drawback, i.e., the generation of the seeds mentioned above, Patent Document 3 (Japanese Unexamined Patent Application, Publication No. 2009-242591) discloses a multilayer film having a layer produced using, as a material, a multilayer pellet constituted with a layer composed of, as a principal component, an ethylene-vinyl alcohol copolymer containing a metal salt, and a layer composed of a polyamide as a principal component. However, depending on the melt kneading condition of the pellet in the film production, the film may generate the turbidity and/or the whitening streaks in a part of the film after a heating treatment, similarly to the invention disclosed in Patent Document 1.

PATENT DOCUMENTS

Patent Document 1: Japanese Unexamined Patent Application, Publication No. H4-131237
Patent Document 2: Japanese Unexamined Patent Application, Publication No. H7-97491
Patent Document 3: Japanese Unexamined Patent Application, Publication No. 2009-242591

SUMMARY OF THE INVENTION

Problems to be Solved by the Invention

A principal object of the present invention is to provide a film or sheet that is superior in thermal stability in the film formation (with fewer seeds (dirt under paint) generated) and superior in appearance after the heating treatment (with fewer whitening streaks and less turbidity in a part of the film or sheet, in particular), as compared with the films or sheets produced using conventional resin composition pellets containing the EVOH and the PA.

Means for Solving the Problems

The present inventors thoroughly studied in order to achieve the object, and consequently found that a resin composition pellet that achieves the aforementioned object can be obtained by blending EVOH, PA, and a lower fatty acid magnesium salt each in a specific amount, and sufficiently dispersing the lower fatty acid magnesium salt in both the EVOH and the PA. Thus, the present invention was accomplished.

Specifically, the present invention includes the following aspects.

(1) A pelletized resin composition containing an ethylene-vinyl alcohol resin (A), a polyamide resin (B) and a lower fatty acid magnesium salt (C), wherein the pelletized resin composition contains with respect to 100 parts by mass in total of the ethylene-vinyl alcohol resin (A) and the polyamide resin (B), 55 to 99 parts by mass of the ethylene-vinyl alcohol resin (A), 1 to 45 parts by mass of the polyamide resin (B), and 0.001 to 0.05 parts by mass of the lower fatty acid magnesium salt (C) in terms of metal atom equivalent, the polyamide resin (B) is dispersed in the ethylene-vinyl alcohol resin (A) with an average dispersed particle diameter of 1 μm or less as determined using an electron microscope, and the lower fatty acid magnesium salt (C) is dispersed in both the ethylene-vinyl alcohol resin (A) and the polyamide resin (B).

(2) The pelletized resin composition according to item (1), wherein the lower fatty acid magnesium salt (C) is acetic acid magnesium salt.

(3) The pelletized resin composition according to item (1) or (2), wherein the polyamide resin (B) is nylon 6.

(4) A film produced by melt-molding of the pelletized resin composition according to any one of items (1) to (3).

(5) The film according to item (4) which is a packaging material for a retort treatment or a packaging material for a boiling treatment.

(6) A molded article produced by secondary processing of the film according to item (4) or (5).

(7) A production method of the pelletized resin composition according to any one of items (1) to (3), including the steps of: immersing the ethylene-vinyl alcohol resin (A) in an aqueous solution containing the lower fatty acid magnesium salt (C); immersing the polyamide resin (B) in an aqueous solution containing the lower fatty acid magnesium salt (C); and melt-extruding the ethylene-vinyl alcohol resin (A) immersed and the polyamide resin (B) immersed.

(8) A production method of the pelletized resin composition according to any one of items (1) to (3), including the step of adding an aqueous solution containing the lower fatty acid magnesium salt (C) in melt-extruding a mixture of the ethylene-vinyl alcohol resin (A) and the polyamide resin (B).

Effects of the Invention

The pelletized resin composition according to the aspect of the present invention is superior in hue. A film produced using the pelletized resin composition according to the aspect of the present invention is superior in thermal stability in film formation (with fewer seeds (dirt under paint) generated), in appearance immediately after the film formation (with fewer streaks generated along the extrusion direction and less unevenness in thickness), and in particular, in appearance after a heating treatment (with less whitening of a partial or entire surface of the film).

DESCRIPTION OF EMBODIMENTS

Pelletized Resin Composition

A pelletized resin composition according to an embodiment of the present invention contains an ethylene-vinyl alcohol resin (A) (hereinafter, may be abbreviated as EVOH (A)), a polyamide resin (B) (hereinafter, may be abbreviated as PA (B)), and a lower fatty acid magnesium salt (C), wherein the PA (B) is dispersed in the EVOH (A), the lower fatty acid magnesium salt (C) is dispersed in both the EVOH (A) and the PA (B), and the average dispersed particle diameter of the PA (B) as determined using an electron microscope is 1 μm or less.

Due to satisfying the above-mentioned conditions, the pelletized resin composition according to the embodiment of the present invention are characterized by superior appearance after a heating treatment, in particular, less whitening of a part of the film (with less turbidity and fewer whitening streaks in a part of the film), as compared with the conventional resin composition pellets.

Although not clarified, the cause of the generation of the whitening streak and/or the partial turbidity after the heating treatment on a film or sheet (hereinafter, may be abbreviated as film etc.) produced using the conventional resin composition pellets composed of the EVOH, the PA and the metal salt is inferred by the present inventors as in the following. Specifically, the EVOH part (i.e., the part where the EVOH is included) constituting the film etc. would absorb moisture during the heating treatment, resulting in the swelling thereof. Thereafter, the film etc. after the completion of the heating treatment would shrink with a loss of the moisture, and the shrinkage of the film etc. would be arrested at a certain stage while the moisture would continue to be lost. As a result, an area in which physical force is locally applied would be generated in the film etc., and starting from the area, dot-like cavities or crack-like cavities in the form of a chain of dots would be generated in the film etc. In this stage, rays of light entering the film etc. having the cavities from the outside would be irregularly reflected on an interface between the EVOH part constituting the film etc. and the cavities, leading to whitening of a part of the film etc. after the heating treatment.

On the other hand, in the film etc. produced using the pelletized resin composition according to the embodiment of the present invention, the PA which is less water-absorbing than the EVOH would be highly dispersed in the EVOH. Accordingly, as compared with a film etc. produced using the conventional resin composition pellets, the film etc. would include much fewer regions in which the EVOH is present as local agglomerates without containing the PA, and consequently the film etc. after the heating treatment would shrink uniformly. As a result, even though the moisture continues to be lost from the film etc. after the heating treatment, a region on which shrinkage stress acts such that fine cavities are generated would be less likely to be generated within the film etc., and consequently the resulting film etc. would not exhibit whitening of a part thereof after the heating treatment.

Ethylene-Vinyl Alcohol Resin (A)

In the embodiment of the present invention, the EVOH (A) can be obtained by saponifying an ethylene-vinyl ester copolymer. The vinyl ester is typified by vinyl acetate, but other vinyl ester, for example, fatty acid vinyl ester (vinyl propionate, vinyl pivalate and the like) may be used.

In the embodiment of the present invention, the lower limit of the ethylene unit content in the EVOH (A) is preferably 5 mol %, more preferably 10 mol %, still more preferably 20 mol %, and particularly preferably 23 mol %. The upper limit of the ethylene unit content is preferably 70 mol %, more preferably 50 mol %, still more preferably 40 mol %, and particularly preferably 38 mol %. When the ethylene unit content is less than 5 mol %, the film etc. may have insufficient gas barrier properties under high humidity and/or unsatisfactory appearance after the heating treatment. When the ethylene unit content is greater than 70 mol %, the film etc. may have insufficient gas barrier properties regardless of the level of the humidity.

In the embodiment of the present invention, the degree of saponification of the vinyl ester component of the EVOH (A) is preferably 85 mol % or greater, more preferably 90 mol %, still more preferably 96 mol %, and particularly preferably 98 mol %. When the degree of saponification is less than 85 mol %, the molded article may have deteriorated gas barrier properties under high humidity.

In addition, in the production of the EVOH (A), other comonomer, for example, propylene, butylene, an unsaturated carboxylic acid or an ester thereof, a vinylsilane compound, and N-vinylpyrrolidone and the like may be copolymerized within a range not leading to inhibition of the achievement of the object of the present invention.

In regard to the melt viscosity of the EVOH (A) at 210° C. under the condition involving a load of 2,160 g, the lower limit of MFR is preferably 0.5 g/10 min, and more preferably 1.0 g/10 min, whereas the upper limit of the MFR is preferably 15 g/10 min, and more preferably 10 g/10 min. When the EVOH (A) having such a melt viscosity is used, the melt formability of the pelletized resin composition finally obtained may be further enhanced. Even in the case where the EVOH (A) contains the abovementioned other monomer, it is preferred that the MFR falls within the above range.

In the embodiment of the present invention, it is necessary that the content of the EVOH (A) contained in the pelletized resin composition with respect to 100 parts by mass in total of the EVOH (A) and the PA (B) is 55 to 99 parts by mass. The lower limit of the content of the EVOH (A) is preferably 60 parts by mass, and more preferably 70 parts by mass. The upper limit of the content of the EVOH (A) is preferably 95 parts by mass, and more preferably 90 parts by mass. When the content of the EVOH (A) is less than 55 parts by mass, the hue of the pellet may be deteriorated, and the film etc. may have insufficient gas barrier properties, unsatisfactory appearance immediately after film formation, and unsatisfactory appearance after a heating treatment. When the content of the EVOH (A) is greater than 99 parts by mass, the hue of the pellet may be deteriorated, and the film etc. may have unsatisfactory appearance after the heating treatment.

Two or more types of EVOHs which differ in ethylene unit content, degree of saponification, degree of polymerization, etc. may be used in combination as the EVOH (A).

Polyamide Resin (B)

In the embodiment of the present invention, specific examples of the PA (B) include polycaproamide (nylon 6), poly-ω-aminoheptanoic acid (nylon 7), poly-ω-aminononanoic acid (nylon 9), polyundecanamide (nylon 11), polylauryllactam (nylon 12), polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 106), caprolactam/lauryllactam copolymer (nylon 6/12), caprolactam/ω-aminononanoic acid copolymer (nylon 6/9), caprolactam/hexamethylenediammonium adipate copolymer (nylon 6/66), lauryllactam/hexamethylenediammonium adipate copolymer (nylon 12/66), ethylenediammonium adipate/hexamethylenediammonium adipate copolymer (nylon 26/66), caprolactam/hexamethylenediammonium adipate/hexamethylenediammonium sebacate copolymer (nylon 6/66/610), ethylenediammonium adipate/hexamethylenediammonium adipate/hexamethylenediammonium sebacate copolymer (nylon 26/66/610), polyhexamethylene isophthalamide (nylon 6I), polyhexamethylene terephthalamide (nylon 6T), hexamethylene isophthalamide/hexamethylene terephthalamide copolymer (nylon 6I/6T), 11-aminoundecanamide/hexamethylene terephthalamide copolymer, polynonamethylene terephthalamide (nylon 9T), polydecamethylene terephthalamide (nylon 10T), polyhexamethylene cyclohexylamide, polynonamethylene cyclohexylamide, and modified polyamides obtained by modifying these polyamides with an aromatic amine such as methylene benzylamine and metaxylene diamine. Examples of the PA (B) also include metaxylylenediammonium adipate, and the like.

Of these, in light of an improvement of the appearance characteristics after the heating treatment, the PA (B) is preferably a polyamide resin constituted with caproamide as a principal constituent, and specifically, it is preferred that the caproamide unit accounts for no less than 75 mol % of constitutional units of the polyamide resin. Among such PAs, nylon 6 is preferred in light of the compatibility with the EVOH (A).

Melt polymerization, interfacial polymerization, solution polymerization, bulk polymerization, solid phase polymerization, or a combination thereof may be employed as the polymerization method for providing the PA (B).

In the embodiment of the present invention, it is necessary that the content of the PA (B) contained in the pelletized resin composition with respect to 100 parts by mass in total of the EVOH (A) and the PA (B) is 1 to 45 parts by mass. The lower limit of the content is preferably 5 parts by mass, and more preferably 10 parts by mass. The upper limit of the content is preferably 40 parts by mass, and more preferably 30 parts by mass. When the content is less than 1 part by mass, the hue of the pellet may be deteriorated, and the film etc. may have unsatisfactory appearance after the heating treatment. When the content is greater than 45 parts by mass, the film etc. may have insufficient gas barrier properties, unsatisfactory appearance immediately after the film formation, and unsatisfactory appearance after the heating treatment.

Lower Fatty Acid Magnesium Salt (C)

In the embodiment of the present invention, the lower fatty acid in the lower fatty acid magnesium salt (C) as referred to means a fatty acid having 6 or less carbon atoms, and examples thereof include saturated fatty acids such as caproic acid. In light of the compatibility with the EVOH (A), the lower fatty acid is preferably a saturated fatty acid having 3 or less carbon atoms. Among lower fatty acid magnesium salts (C), acetic acid magnesium salt is preferred in light of an odor during the handling.

In regard to the lower fatty acid magnesium salt (C), it has been found that when the lower fatty acid magnesium salt (C) is contained in both the resin composition containing the EVOH (A) and the PA (B), a remarkable effect on thermal stability in the film formation (i.e., inhibition of the generation of seeds (dirt under paint)) is achieved. Although not having been clarified yet, the reason for the achievement of the effect by the combination of the EVOH (A), the PA (B) and the lower fatty acid magnesium salt (C) is inferred by the present inventors as in the following. Specifically, even if a crosslinking reaction between the EVOH (A) and the PA (B) proceeds, the lower fatty acid magnesium salt (C) would catalyze scission of the main chain of the EVOH (A), and consequently gelatinous matter originating from the PA (B) would not grow in size. Thus, the thermal stability in the film formation would be improved.

Magnesium salts other than the lower fatty acid magnesium salt (C) which may be used in the embodiment of the present invention are insufficient in regard to the achievement of the effects of the invention. For example, when a higher aliphatic acid magnesium salt is used, the affinity thereof for the EVOH (A) is lower as compared with the lower fatty acid magnesium salt (C), and consequently the effect of the improvement of the thermal stability in the film formation is insufficient. Whereas, when magnesium hydroxide or magnesium oxide is used, the hue of the resulting pellet and/or the thermal stability of the resulting pellet in the film formation may be deteriorated, and therefore magnesium hydroxide and magnesium oxide are not suitable for use in the present invention.

In the embodiment of the present invention, it is necessary that the content of the lower fatty acid magnesium salt (C) contained in the pelletized resin composition with respect to 100 parts by mass in total of the EVOH (A) and the PA (B) is 0.001 to 0.05 parts by mass in terms of metal atom equivalent. The lower limit of the content is preferably 0.002 parts by mass, and more preferably 0.006 parts by mass. The upper limit of the content of the lower fatty acid magnesium salt (C) is preferably 0.04 parts by mass, and more preferably 0.03 parts by mass. When the content is less than 0.001 parts by mass, the thermal stability of the film etc. in the film formation may be insufficient. When the content of the lower fatty acid magnesium salt (C) is greater than 0.05 parts by mass, the shape of film etc. may be deteriorated.

In the embodiment of the present invention, it is necessary that the PA (B) is dispersed in the EVOH (A) largely constituting the pelletized resin composition. The phrase "the PA (B) is dispersed in EVOH (A)" as referred to herein means that the EVOH (A) constitutes a matrix phase and the PA (B) constitutes a dispersed phase.

In the embodiment of the present invention, it is necessary that the average dispersed particle diameter of the PA (B) dispersed in the EVOH (A) is 1 μm or less. In this regard, the average dispersed particle diameter as referred to means a particle diameter calculated by averaging the sizes of 100 PA (B) particles found in a field of view of an electron microscope in the electron microscopic observation of an arbitrary cross section of the pelletized resin composition according to the embodiment of the present invention. In a case where the cross section of the PA (B) particle has a shape other than a circle, such as an ellipse, the calculation shall be made using the value of the longitudinal diameter of the PA (B) particle.

In the embodiment of the present invention, it is necessary that the lower fatty acid magnesium salt (C) is dispersed in both the EVOH (A) and the PA (B). In this regard, the phrase "the lower fatty acid magnesium salt (C) is dispersed in both the EVOH (A) and the PA (B)" as referred to means that the lower fatty acid magnesium salt (C) is present both in both the EVOH (A) and the PA (B) in such a dispersion state that clusters of the lower fatty acid magnesium salt (C) are at an undetectable level in the observation of the resin composition pellet using an electron microscope having a spatial resolution of 1 nm. When the lower fatty acid magnesium salt (C) is so aggregated that clusters thereof are found in the observation mentioned above, the effects of the present invention are highly unlikely to be achieved.

The pelletized resin composition according to the embodiment of the present invention may contain one or more types of resin other than the EVOH (A) and the PA (B) within a range not leading to impairment of the effects of the present invention. Examples of such a resin include polyolefins, and the like.

The pelletized resin composition according to the embodiment of the present invention may contain one or more types of metal salt other than the lower fatty acid magnesium salt (C). Examples of the metal salt include: various types of alkali metal salts such as lithium salts, sodium salts, potassium salts, rubidium salts and cesium salts; alkaline earth metal salts such as calcium salts, barium salts and strontium salts; and further, various types of metal salts having a valency of 3 or greater. When the pelletized resin composition containing such a metal salt is melt-molded, long-run workability in the production of the film etc. is highly likely to be improved.

The resin composition according to the embodiment of the present invention may contain as appropriate in addition to the components mentioned above, a well-known additive such as a plasticizer, a filler, an antiblocking agent, an antioxidant, a colorant, an antistatic agent, an ultraviolet ray-absorbing agent, a lubricant and a drying agent within the range not leading to impairment of the effects of the present invention. Specifically, the amount of the additive with respect to 100 parts by mass in total of the EVOH (A) and the PA (B) is preferably 2 parts by mass or less, and more preferably 1 part by mass or less. When the amount of the additive with respect to 100 parts by mass in total of the EVOH (A) and the PA (B) is greater than the 2 parts by mass, the PA (B) may form clusters.

The production method of the pelletized resin composition according to the embodiment of the present invention is not particularly limited, and a well-known apparatus and a well-known method may be applied; the following methods are recommended for achieving the dispersibility described above.

According to an exemplary method, pellets of the EVOH (A) and pellets of the PA (B) are first produced. Thereafter, the pellets of the EVOH (A) and the pellets of the PA (B) are each immersed in or brought into contact with an aqueous solution containing the lower fatty acid magnesium salt (C) that has been prepared beforehand, for a sufficient time period, e.g., 1 sec to 1 day, followed by removal, and the pellets of the EVOH (A) and the pellets of the PA (B) are melt-extruded together using a single screw extruder, a twin-screw extruder, or the like to achieve pelletization, whereby the pellets of the embodiment of the present invention are obtained.

According to another exemplary method, the pellets of the EVOH (A) and the pellets of the PA (B) are dry-blended, and thereafter melt-extruded together with the lower fatty acid magnesium salt (C) that has been prepared beforehand, or an aqueous solution containing the prepared lower fatty acid magnesium salt (C), using a single screw extruder, a twin-screw extruder, or the like to achieve pelletization, whereby the pellets of the embodiment of the present invention are obtained.

The pelletized resin composition according to the embodiment of the present invention can be molded into, for example, a film, a sheet, a container, other packaging material (for foods, medical drugs, etc.), and the like through melt molding. In particular, a film or sheet produced using the pelletized resin composition can prevent the whitening of a part thereof, which may matter, after the heating treatment, and therefore is suitable for use as a packaging material for a retort treatment or a packaging material for a boiling treatment. In addition, the film or sheet thus produced may be subjected to secondary processing to produce a molded article.

In the embodiment of the present invention, the film or sheet may be either single-layered or multi-layered. Preferably, for the purpose of preventing the deterioration of the gas barrier performances of the resin composition due to moisture, the film or sheet is used in the form of a multilayer structure having the film or sheet and a layer composed of a hydrophobic thermoplastic resin.

Examples of the hydrophobic thermoplastic resin include polyolefin resins (such as polyethylene resins and polypropylene resins), grafted polyolefin resins graft-modified with an unsaturated carboxylic acid or an ester thereof, halogenated polyolefin resins, ethylene-vinyl acetate copolymer resins, ethylene-acrylic acid copolymer resins, ethylene-acrylic acid ester copolymer resins, polyester resins, polyamide resins, polyvinyl chloride resins, polyvinylidene chloride resins, acrylic resins, polystyrene resins, vinyl ester resins, ionomers, polyester elastomers, polyurethane elastomers, aromatic or aliphatic polyketones, and the like. Among these, in light of mechanical strength and molding processability, polyolefin resins are preferred, and polyethylene resins or polypropylene resins are still more preferred.

In addition, a layer of a material such as paper, metal foil, woven fabric, nonwoven fabric, metal cotton, wooden material, aluminum- or silica-vapor deposition film may be combined with the layer of the resin to form the multilayer structure.

The layer configuration of the multilayer structure is exemplified by the following layer configurations, wherein: "F" represents a layer formed from the pelletized resin composition according to the embodiment of the present invention; "A" represents a layer composed of a hydrophobic thermoplastic resin; and "MA" represents a layer composed of the hydrophobic thermoplastic resin modified with an unsaturated carboxylic acid or a derivative thereof. The layers represented from the left to right in each layer configuration below are to be provided to follow the order, from the outer side (i.e., the side nearest the external environment) to the inner side. The layer MA composed of the hydrophobic thermoplastic resin modified with the unsaturated carboxylic acid or a derivative thereof may be used as an adhesive resin layer, or an outer layer.

2 layers: MA/F
3 layers: A/MA/F, MA/F/MA, F/MA/F
4 layers: A/MA/F/MA, MA/F/MA/F
5 layers: F/MA/A/MA/F, A/MA/F/MA/A MA/F/MA/F/MA, A/MA/F/MA/F
6 layers: A/MA/F/MA/A/MA
7 layers: A/MA/F/MA/F/MA/A

EXAMPLES

Hereinafter, the present invention will be explained in detail by way of Examples and Comparative Examples, but the present invention is not limited to the following Examples. It is to be noted that production methods as well as methods of measurement, calculation and evaluation in Examples and Comparative Examples were each as described below.

Determination of Amount of Fatty Acid Metal Salt in Resin Composition Pellet

Resin composition pellet of each Example or Comparative Example in an amount of 10 g was charged into 50 mL of a 0.01 N aqueous hydrochloric acid solution, and the mixture was stirred at 95° C. for 6 hours. The amount of a magnesium ion, a sodium ion or a zinc ion in the aqueous solution obtained after completion of the stirring was quantitatively determined by ion chromatography, whereby the amount of the fatty acid metal salt in the resin composition pellet was calculated. The amount of the fatty acid metal salt was calculated in terms of metal equivalent with respect to 100 parts by mass of the resin composition pellet composed of the EVOH and the PA. ICS-C25 manufactured by Yokogawa Electric Corporation was used as a column, an aqueous solution containing 5.0 mM tartaric acid and 1.0 mM 2,6-pyridinedicarboxylic acid was used as an eluent, and a calibration curve was created using an aqueous magnesium chloride solution, an aqueous sodium chloride solution or a zinc nitrate solution.

Calculation of Average Dispersed Particle Diameter of PA

The resin composition pellets of each Example or Comparative Example were embedded in an epoxy resin, and cut with an ultramicrotome to prepare a section along the transverse direction. The transverse section thus obtained was subjected to electron staining in a 5% aqueous phosphotungstic acid solution for 3 min, followed by drying, and then observed using a transmission electron microscope (TEM) "JEM2100F" manufactured by JEOL, Ltd. at an observation magnification of ×20,000. In the observation, the dispersed particle diameters of 100 PA particles were measured, and the average thereof was calculated, whereby the average dispersed particle diameter was defined. It is to be noted that in the observation using the TEM, the EVOH was recognized as a bright contrast area in the photograph, whereas the PA was recognized as a dark contrast area. The dispersion of the fatty acid metal salt was confirmed by the detection of the metal atom in the EVOH phase and in the PA phase by means of a scanning electron microscope equipped with EDX manufactured by JEOL, Ltd.

Evaluation of Hue of Pellet

The resin composition pellet of each Example or Comparative Example was visually observed, and evaluated according to the following criteria.

A: not yellowed
B: somewhat yellowed
C: clearly yellowed

Evaluation of Thermal Stability in Film Formation

Continuous formation of a film having the thickness of 20 μm was carried out for 8 hours by feeding the resin composition pellets of each Example or Comparative Example to a single screw melt extruder equipped with a full flight screw having a diameter of 20 mm and a coat-hanger die having a width of 300 mm, and melt-extruding the resin composition pellets at 230° C. The operation of the film formation was observed with time over 8 hours with a defect-detector (size of field of view: 8 cm×100 cm). Then, the number of unmelted seeds (dirt under paint) (having a diameter of about 20 μm or greater) which was present in the film was determined, and evaluation was made according to the following criteria.

A: the number of unmelted seeds being less than 100
B: the number of unmelted seeds being 100 or greater and less than 200
C: the number of unmelted seeds being 200 or greater Evaluation of Appearance Immediately after Film Formation A film was formed from the resin composition pellet of each Example or Comparative Example (the conditions of the film formation were identical to those in the production method described in the section "Evaluation of Thermal Stability in Film Formation" described above, and a film obtained after 1 hour from the start of the film formation was used), and then a 15 cm×15 cm piece was cut from the film thus obtained. The 15 cm×15 cm piece was visually observed, and evaluated according to the following criteria.

A: neither streaks generated along the extrusion direction, nor unevenness in thickness being found
B: fine streaks being found
C: unevenness in thickness or hole formation being found Evaluation of Appearance after Heating Treatment An adhesive for dry lamination ("TAKENATE A-385/A-50" manufactured by Takeda Chemical Industries, Ltd.; two component, urethane adhesive) was applied (solid matter: 4 g/m$^2$) onto a film (thickness: 20 μm) formed from the resin composition pellet of each Example or Comparative Example, followed by evaporation of the solvent at 80° C. Then, an unstretched polypropylene film ("RXC-18" manufactured by Tohcello Co., Ltd.; thickness: 60 µm; hereinafter, may be abbreviated as PP) was stuck to the film, whereby a laminate was obtained. Further, the adhesive for dry lamination was applied (solid matter: 4 g/m$^2$) onto the surface of the resin composition film of the laminate, followed by evaporation of the solvent at 80° C., then a PA6 film ("Emblem ONBC" manufactured by Unitika Limited; thickness: 15 µm) was stuck to the laminate, and thereafter aging was carried out at 40° C. for 4 days, whereby a multilayer film having a configuration of PP/adhesive/EVOH composition/adhesive/PA6 was obtained. Next, the multilayer film thus obtained was subjected to a hot water treatment at 121° C. for 30 min using a high-temperature and high-pressure cooking sterilization tester "RCS-40RTGN" manufactured by HISAKA WORKS, LTD. After the hot water treatment, the multilayer film was stored in a room at 20° C. and 65% RH for 1 day, and the appearance of the multilayer film was visually observed and evaluated according to the following criteria.
A: whitening not being found partially or entirely on the surface of the film
B: slight whitening being found on a part of the film, but the transparency of the film being maintained
C: whitening being found partially or entirely on the surface of the film, and the transparency of the film being deteriorated Example 1

Pellets of "EVAL" available from Kuraray Co., Ltd. (ethylene unit content: 48 mol %; and degree of saponification: 99.9%) as the EVOH and pellets of "SF1018A" manufactured by Ube Industries, Ltd. as the PA were dry-blended such that 90 parts by mass of "EVAL" and 10 parts by mass of "SF1018A" were included, followed by feeding the blend to a twin-screw extruder, and an aqueous solution of magnesium acetate prepared so as to have a concentration of 0.5 g/L was added thereto as the fatty acid metal salt using a pump for liquid addition, whereby melt-extrusion was carried out. The melt extrusion was carried out under the condition involving the melt temperature of 220 to 230° C. and the extrusion speed of 200 kg/hr. Then, the strand obtained by the extrusion was cooled in a cooling bath to permit hardening, followed by cutting, whereby resin composition pellets were produced. The resin composition pellets were evaluated in accordance with the abovementioned methods. The results of the evaluations are shown in Table 1.

TABLE 1

|  | Example 1 | Example 2 | Example 3 | Example 4 | Example 5 | Example 6 | Example 7 |
| --- | --- | --- | --- | --- | --- | --- | --- |
| EVOH (parts by mass) | 90 | 90 | 90 | 90 | 90 | 90 | 90 |
| PA (parts by mass) | 10 | 10 | 10 | 10 | 10 | 10 | 10 |
| fatty acid metal salt (parts by mass) | 0.012 | 0.012 | 0.012 | 0.012 | 0.012 | 0.012 | 0.012 |
| type of fatty acid metal salt | Mg acetate | Mg acetate | Mg acetate | Mg acetate | Mg acetate | Mg acetate | Mg acetate |
| ethylene unit content in EVOH (mol %) | 48 | 44 | 38 | 35 | 32 | 27 | 24 |
| average dispersed particle diameter of PA (µm) | 0.05 | 0.05 | 0.05 | 0.05 | 0.05 | 0.05 | 0.05 |
| detection of metal atom | (A), (B) | (A), (B) | (A), (B) | (A), (B) | (A), (B) | (A), (B) | (A), (B) |
| hue of pellet | A | A | A | A | A | A | A |
| thermal stability in film formation | A | A | A | A | A | A | A |
| appearance immediately after film formation | A | A | A | A | A | A | A |
| appearance after heat treatment | A | A | A | A | A | A | A |

* In the column of "detection of metal atom", (A) indicates the detection of the metal atom in the EVOH (A), whereas (B) indicates the detection of the metal atom in the PA (B).

Examples 2 to 7

Resin composition pellets were produced in a similar manner to Example 1 except that the ethylene unit content of the EVOH was changed, and the resin composition pellets were evaluated in accordance with the abovementioned methods. Each Example and the results of the evaluations thereof are shown in Table 1. It is to be noted that "EVAL" available from Kuraray Co., Ltd. was used as the EVOH in each Example.

Examples 8 to 17

Resin composition pellets were produced in a similar manner to Example 1 except that "EVAL" available from Kuraray Co., Ltd. (ethylene unit content: 32 mol % or 27 mol %; and degree of saponification: 99.9%) was used as the EVOH, and the amount of the EVOH, the amount of the PA, and the amount of the fatty acid metal salt were changed. Then, the resin composition pellets were evaluated in accordance with the abovementioned methods. Each Example and the results of the evaluations thereof are shown in Table 2.

TABLE 2

|  | Example 8 | Example 9 | Example 10 | Example 11 | Example 12 | Example 13 | Example 14 | Example 15 | Example 16 | Example 17 | Example 18 | Example 19 |
|---|---|---|---|---|---|---|---|---|---|---|---|---|
| EVOH (parts by mass) | 70 | 60 | 90 | 90 | 80 | 80 | 80 | 85 | 85 | 85 | 90 | 90 |
| PA (parts by mass) | 30 | 40 | 10 | 10 | 20 | 20 | 20 | 15 | 15 | 15 | 10 | 10 |
| fatty acid metal salt (parts by mass) | 0.012 | 0.012 | 0.022 | 0.044 | 0.012 | 0.015 | 0.022 | 0.012 | 0.015 | 0.022 | 0.012 | 0.012 |
| type of fatty acid metal salt | Mg acetate | Mg acetate | Mg acetate | Mg acetate | Mg acetate | Mg acetate | Mg acetate | Mg acetate | Mg acetate | Mg acetate | Mg acetate | Mg acetate |
| ethylene unit content in EVOH (mol %) | 32 | 32 | 32 | 32 | 32 | 32 | 32 | 27 | 27 | 27 | 32 | 32 |
| average dispersed particle diameter of PA (μm) | 0.09 | 0.1 | 0.05 | 0.05 | 0.07 | 0.07 | 0.07 | 0.06 | 0.06 | 0.06 | 0.05 | 0.06 |
| detection of metal atom | (A), (B) | (A), (B) | (A), (B) | (A), (B) | (A), (B) | (A), (B) | (A), (B) | (A), (B) | (A), (B) | (A), (B) | (A), (B) | (A), (B) |
| hue of pellet | B | B | A | A | A | A | A | A | A | A | A | A |
| thermal stability in film formation | A | A | B | A | A | A | A | A | A | A | A | A |
| appearance immediately after film formation | A | B | A | A | A | A | A | A | A | A | A | A |
| appearance after heat treatment | A | A | A | A | A | A | A | B | A | A | A | A |

* In the column of "detection of metal atom", (A) indicates the detection of the metal atom in the EVOH (A), whereas (B) indicates the detection of the metal atom in the PA (B).

Example 18

EVOH pellets (ethylene unit content: 32 mol %; and degree of saponification: 99.9%) having a moisture content of 20% by mass were prepared as the EVOH, and an aqueous solution of magnesium acetate that had been prepared beforehand was brought into contact for 1 hour with an aqueous solution having a concentration of 0.5 g/L. Then, the EVOH pellets were subjected to hot-air drying in a nitrogen atmosphere, whereby magnesium acetate-containing EVOH pellets were obtained. Magnesium acetate-containing PA pellets were obtained as the PA in a similar manner from "SF1018A" manufactured by Ube Industries, Ltd. Thereafter, the magnesium acetate-containing EVOH pellets and the magnesium acetate-containing PA pellets were dry-blended such that 90 parts by mass of the magnesium acetate-containing EVOH pellets and 10 parts by mass of the magnesium acetate-containing PA pellets were included, followed by feeding the blend to a twin-screw extruder, whereby melt-extrusion was carried out. The melt extrusion was carried out under the condition involving the melt temperature of 200 to 250° C. and the extrusion speed of 200 kg/hr. Then, the strand obtained by the extrusion was cooled in a cooling bath to permit hardening, followed by cutting, whereby resin composition pellets were produced. The resin composition pellets were evaluated in accordance with the abovementioned methods. The results of the evaluations are shown in Table 2.

Example 19

Resin composition pellets were produced in a similar manner to Example 18 except that a single screw extruder was used in the melt extrusion. The melt extrusion was carried out under the condition involving the melt temperature of 220 to 230° C. and the extrusion speed of 100 kg/hr. Then, the resin composition pellets thus obtained were evaluated in accordance with the abovementioned methods. The results of the evaluations are shown in Table 2.

Comparative Examples 1 to 3

Resin composition pellets were produced in a similar manner to Example 1 except that "EVAL" available from Kuraray Co., Ltd. (ethylene unit content: 32 mol %; and degree of saponification: 99.9%) was used as the EVOH, and the amount of the EVOH, the amount of the PA and the amount of the fatty acid metal salt were changed. Then, the resin composition pellets were evaluated in accordance with the abovementioned methods. Each Comparative Example and the results of the evaluations thereof are shown in Table 3.

TABLE 3

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| EVOH (parts by mass) | 100 | 40 | 90 | 90 | 90 | 90 | 90 | 80 |
| PA (parts by mass) | 0 | 60 | 10 | 10 | 10 | 10 | 10 | 20 |
| fatty acid metal salt (parts by mass) | 0.012 | 0.012 | 0 | 0.05 | 0.012 | 0.012 | 0.012 | 0.024 |
| type of fatty acid metal salt | Mg acetate | Mg acetate | — | Mg hydroxide | Na acetate | Mg stearate | Mg acetate | Mg acetate Zn acetate |

TABLE 3-continued

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| ethylene unit content in EVOH (mol %) | 32 | 32 | 32 | 32 | 32 | 32 | 32 | 28 |
| average dispersed particle diameter of PA (μm) | — | 10< | 5 | 3 | 0.05 | 0.05 | — | 1.2 |
| detection of metal atom | (A) | (A), (B) | — | (A), (B) | (A), (B) | (A), (B) | (A) | (A), (B) |
| hue of pellet | B | B | C | B | C | B | A | B |
| thermal stability in film formation | A | A | C | C | C | C | A | A |
| appearance immediately after film formation | A | C | C | C | A | A | A | A |
| appearance after heat treatment | C | C | C | B | B | B | C | C |

* In the column of "detection of metal atom", (A) indicates the detection of the metal atom in the EVOH (A), whereas (B) indicates the detection of the metal atom in the PA (B).

Comparative Examples 4 and 5

Resin composition pellets were produced in a similar manner to Example 1 except that "EVAL" available from Kuraray Co., Ltd. (ethylene unit content: 32 mol %; and degree of saponification: 99.9%) was used as the EVOH, and an aqueous magnesium hydroxide solution (an aqueous solution having a concentration of 0.3 g/L) or an aqueous sodium acetate solution (an aqueous solution having a concentration of 0.3 g/L) was used in place of the aqueous magnesium acetate solution (the aqueous solution having a concentration of 0.5 g/L). Then, the resin composition pellets were evaluated in accordance with the abovementioned methods. The results of the evaluations are shown in Table 3.

Comparative Example 6

Resin composition pellets were produced in a similar manner to Example 1 except that "EVAL" available from Kuraray Co., Ltd. (ethylene unit content: 32 mol %; and degree of saponification: 99.9%) was used as the EVOH, and a magnesium stearate dispersion (an aqueous solution having a concentration of 0.3 g/L) was used in place of the aqueous magnesium acetate solution (the aqueous solution having a concentration of 0.5 g/L) and added using a pump for liquid addition. Then, the resin composition pellets were evaluated in accordance with the abovementioned methods. The results of the evaluations are shown in Table 3.

Comparative Example 7

"EVAL" available from Kuraray Co., Ltd. (ethylene unit content: 32 mol %; and degree of saponification: 99.9%) as the EVOH was fed to a twin-screw extruder, and an aqueous solution of magnesium acetate as the fatty acid metal salt prepared so as to have a concentration of 0.5 g/L was added thereto using a pump for liquid addition, whereby melt extrusion was carried out. The amount of the aqueous solution of magnesium acetate added was regulated so as to attain 2% by mass with respect to the feed amount of the EVOH to the extruder. The melt extrusion was carried out under the condition involving the melt temperature of 220 to 230° C. and the extrusion speed of 170 kg/hr, and the extrudate was fed to a multilayer die so as to form a sheath layer. Subsequently, PA was melt-extruded using a single screw melt extruder under the condition involving the melt temperature of 240° C. and the extrusion speed of 30 kg/hr, and the PA extrudate was fed to the multilayer die so as to form a core layer. A strand having a core-sheath structure constituted with the sheath layer composed of the resin composition containing the EVOH as a principal component and the core layer composed of the PA (mass ratio of the sheath layer and the core layer being 90/10) was extruded from the multilayer die. The strand obtained by the extrusion was cooled in a cooling bath to permit hardening, followed by cutting, whereby resin composition pellets were obtained. A film was formed as described above using the resin composition pellets thus obtained, and evaluated. The results of the evaluations are shown in Table 3.

Comparative Example 8

Pellets of "EVAL" available from Kuraray Co., Ltd. (ethylene unit content: 28 mol %; degree of saponification: 99.8%) as the EVOH and pellets of a PA-6/12 copolymer (having the weight ratio of the caprolactam unit to the lauryllactam unit of 80/20, the melting point of 196° C., and the relative viscosity of 2.5) as the PA were dry-blended such that 80 parts by mass of "EVAL" and 20 parts by mass of the PA-6/12 copolymer were included. Then, to the blended matter were added magnesium acetate in an amount of 120 ppm in terms of metal equivalent and zinc acetate in an amount of 120 ppm in terms of metal equivalent as the fatty acid metal salt, and melt-extruded using a single screw extruder (die temperature: 230° C.). The melt extrusion was carried out under the condition involving the melt temperature of 220 to 230° C. and the extrusion speed of 40 kg/hr. Then, the strand obtained by the extrusion was dried, whereby resin composition pellets were produced, and the resin composition pellets were evaluated in accordance with the abovementioned methods. The results of the evaluations are shown in Table 3.

INDUSTRIAL APPLICABILITY

The resin composition pellet according to the embodiment of the present invention is superior in hue. In addition, a film produced using the resin composition pellet according to the embodiment of the present invention is superior in the thermal stability in the film formation, the appearance immediately after the film formation, and the appearance after the heating treatment. Therefore, the film is suitable for use as a packaging material for heating treatment in the fields of foods and medicaments.

The invention claimed is:

1. A pelletized resin composition, comprising an ethylene-vinyl alcohol resin (A), a polyamide resin (B), and a lower fatty acid magnesium salt (C), wherein:
the pelletized resin composition comprises with respect to 100 parts by mass in total of the ethylene-vinyl alcohol resin (A) and the polyamide resin (B), 55 to 99 parts by mass of the ethylene-vinyl alcohol resin (A), 1 to 45 parts by mass of the polyamide resin (B), and 0.001 to 0.05 parts by mass of the lower fatty acid magnesium salt (C) in terms of metal atom equivalent;
the polyamide resin (B) is dispersed in the ethylene-vinyl alcohol resin (A) with an average dispersed particle diameter of 1 μm or less as determined using an electron microscope; and
the lower fatty acid magnesium salt (C) is dispersed in both the ethylene-vinyl alcohol resin (A) and the polyamide resin (B).

2. The pelletized resin composition according to claim 1, wherein the lower fatty acid magnesium salt (C) is acetic acid magnesium salt.

3. The pelletized resin composition according to claim 1, wherein the polyamide resin (B) is nylon 6.

4. A film produced by melt-molding the pelletized resin composition according to claim 1.

5. The film according to claim 4, which is a packaging material for a retort treatment or a packaging material for a boiling treatment.

6. A molded article produced by secondary processing of the film according to claim 4.

7. A method of producing the pelletized resin composition according to claim 1, the method comprising:
immersing the ethylene-vinyl alcohol resin (A) in an aqueous solution comprising the lower fatty acid magnesium salt (C);
immersing the polyamide resin (B) in an aqueous solution comprising the lower fatty acid magnesium salt (C); and
melt-extruding the ethylene-vinyl alcohol resin (A) immersed and the polyamide resin (B) immersed.

8. A method of producing the pelletized resin composition according to claim 1, the method comprising adding an aqueous solution comprising the lower fatty acid magnesium salt (C) in melt-extruding a mixture of the ethylene-vinyl alcohol resin (A) and the polyamide resin (B).

* * * * *